United States Patent
Biskup et al.

(10) Patent No.: US 6,596,971 B1
(45) Date of Patent: Jul. 22, 2003

(54) PROCESS FOR THE MIG WELDING OF NICKEL AND NICKEL ALLOYS WITH A SHIELDING GAS BASED ON ARGON AND $CO_2$

(75) Inventors: Laurent Biskup, Gisors (FR); Didier Marchand, St Germain en Laye (FR); Jean-Marie Fortain, Osny (FR); Jean-Yves Mouton, Cergy Pontoise (FR)

(73) Assignee: L'Air Liquide-Societe Anonyme a Directoire et Conseil de Surveillance pour l'Etude et l'Exploitation des Procedes Georges Claude, Paris Cedex (FR)

(*) Notice: Subject to any disclaimer, the term of this patent is extended or adjusted under 35 U.S.C. 154(b) by 0 days.

(21) Appl. No.: 09/946,730

(22) Filed: Sep. 6, 2001
(Under 37 CFR 1.47)

(30) Foreign Application Priority Data

Sep. 6, 2000 (FR) .............................................. 00 11349

(51) Int. Cl.[7] .............................................. B23K 9/173
(52) U.S. Cl. .............................. 219/137 WM; 219/74; 219/76.14

(58) Field of Search ................................. 219/137 WM, 219/74, 137 PS, 76, 14; 228/219; 252/372

(56) References Cited

U.S. PATENT DOCUMENTS

| 4,071,732 A | | 1/1978 | Tanaka et al. ........... 219/137 R |
| 4,973,822 A | * | 11/1990 | Evans et al. ........... 219/137 PS |
| 5,083,002 A | * | 1/1992 | Hoback et al. ................ 219/74 |
| 6,111,218 A | * | 8/2000 | Matile et al. ........... 219/137 PS |

FOREIGN PATENT DOCUMENTS

| EP | 0 639 423 A1 | 2/1995 | ............ B23K/9/173 |
| GB | 2 059 846 A | 4/1981 | ............. B23K/9/16 |

* cited by examiner

*Primary Examiner*—M. Alexandra Elve
*Assistant Examiner*—Kevin P. Kerns
(74) *Attorney, Agent, or Firm*—Young & Thompson

(57) ABSTRACT

Process for the MIG welding of nickel and nickel alloys, with the use of a gas shield for at least part of the welding zone, in which process the gas shield is a gas mixture containing from 0.05% to 0.5% $CO_2$, the balance being argon. Advantageously, the gas mixture also contains, by volume, from 15 to 50% helium, preferably from 17% to 30% helium, or from 0.1% to 10% hydrogen by volume and preferably from 1% to 7% hydrogen by volume.

18 Claims, 6 Drawing Sheets

ARGON

ARGON + 0.11% $CO_2$

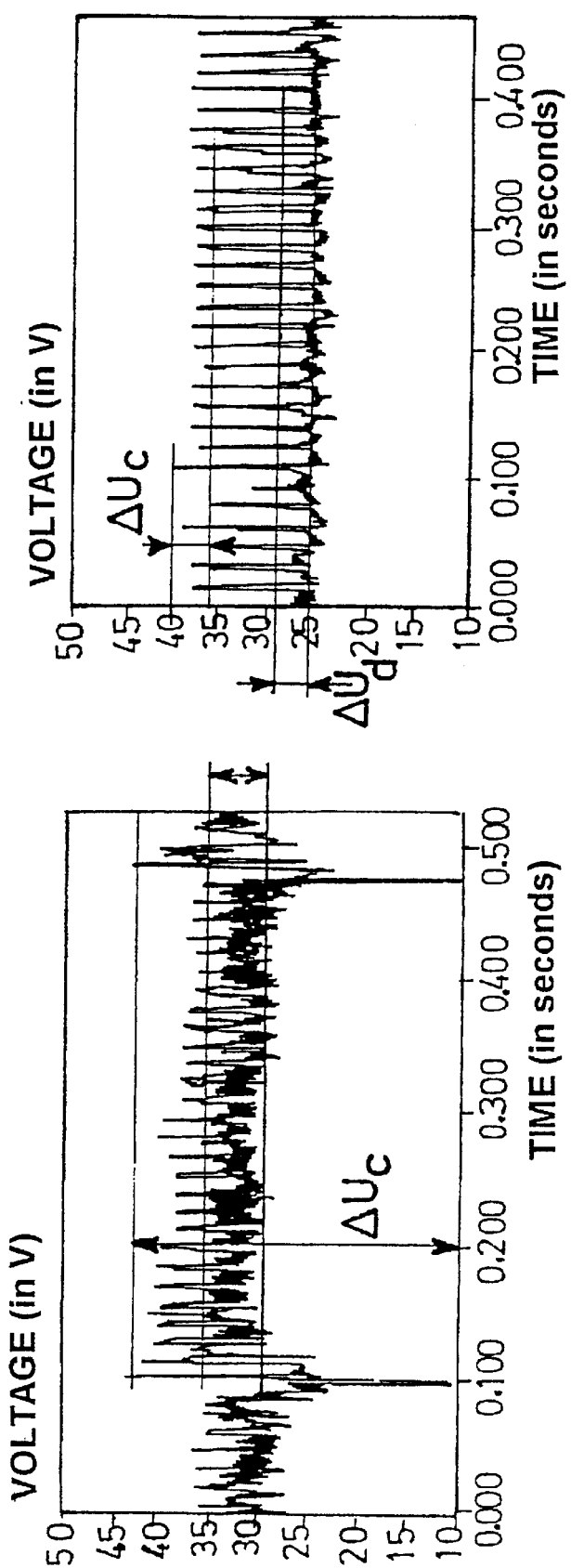

PROCESS FOR THE MIG WELDING OF NICKEL AND NICKEL ALLOYS WITH A SHIELDING GAS BASED ON ARGON AND $CO_2$

FIELD OF THE INVENTION

The present invention relates to an MIG (Metal Inert Gas) welding process for welding nickel alloys efficiently and to special gas mixtures intended for such a process.

BACKGROUND OF THE INVENTION

In MIG welding, the first function of the welding gas is to jointly shield the molten metal which transfers in the arc and comes from the melting of the end of the meltable electrode wire, and the weld puddle consisting of deposited metal and base metal. Argon is an inert gas often used for this purpose.

However, for the MIG welding of steel, it is known that argon alone is insufficient to optimize the process. This is because, beneath argon alone, the arc and the metal transfer in the arc are unstable.

To remedy this problem, it is conventional to add an oxidizing gas to the argon, this having the effect of stabilizing the root of the arc, that is to say the cathode spot, since the slight surface oxidation resulting from the presence of oxygen then makes the materials to be welded more emissive. Thus, more stable and spatter-free welding and a more uniform weld bead are obtained.

As oxidizing gas or stabilizing element, oxygen or carbon dioxide may be used, the nature and the content of the stabilizing element varying according to the grade or the composition of the materials to be welded.

In the case of carbon steels for example, the carbon dioxide ($CO_2$) content varies from a few % to 100% by volume, more usually from 5 to 60 vol %.

In contrast, in the case of stainless steels, for which it is necessary to limit the surface oxidation of the material and the carbon content of the metal deposited, the carbon dioxide content is generally between 1 and 3 vol %, depending on the transfer mode adopted. However, if the oxidizing element is oxygen, since its oxidizing power is greater than that of carbon dioxide, the amount added may be less than these values.

However, at the present time a problem arises in the case of the MIG welding of nickel and nickel alloys.

Nickel and its alloys have two main characteristics which are the basis of why they are used in the chemical, petrochemical, nuclear, aeronautical and space fields, namely:

good corrosion resistance in very varied media. As in the case of stainless steels, it is the addition of chromium which gives the alloy its corrosion resistance, it being possible for this characteristic to be enhanced by the presence of chromium and molybdenum; and good high-temperature resistance, including in an oxidizing medium.

Ignoring the metallurgy of the welding and focusing simply on the operating aspect, that is to say the melting of the wire and the shielding of the molten metal, when welding nickel and its alloys there is the particular feature, compared with stainless steels, that the molten metal has a higher viscosity due to the effects of nickel and molybdenum on the surface tensions of the puddle, and it is more difficult to protect the molten metal remaining at high temperature from oxidation.

This is manifested in general by weld beads that may be domed and irregular, these being characteristic of a metal exhibiting poor wetting and an unstable arc, resulting in an energy density which is too low and poorly distributed.

If the gaseous shielding means employed are insufficient, the weld bead may also be highly oxidized to the point of having blackish adherent coloration difficult to remove.

SUMMARY OF THE INVENTION

Consequently, it is an object of the present invention to provide a process for the MIG welding of nickel and its alloys which makes it possible to produce a welded joint with correct and continuous surface wetting over the entire length with substantially reduced surface oxidation.

In other words, it is an object of the invention to provide a process for the MIG welding of nickel and its alloys using a shielding gas mixture ensuring greater arc stability, higher energy density and better wetting of the weld bead than usually obtained by this process.

This is because, on the one hand, a more stable and more concentrated arc makes it possible to increase the penetration (depth) and therefore, for a given thickness, to increase the welding speed and, on the other hand, by very significantly reducing the surface oxidation of the weld beads, which remains acceptable, it is possible to dispense with the usually necessary operations of grinding or brushing in multipass welding or in weld bead finishing.

The invention therefore relates to a process for the MIG welding of nickel and nickel alloys, with the use of a gas shield for at least part of the welding zone, in which process the gas shield is a gas mixture containing (by volume) from 0.05% to 0.5% $CO_2$, the rest being argon.

Depending on the case, the process of the invention may include one or more of the following characteristics:

the gas mixture furthermore contains, by volume, from 15 to 50% helium, preferably from 17% to 30% helium and preferably less than 25% helium;

the gas mixture furthermore contains from 0.1% to 10% hydrogen by volume and preferably from 1% to 7% hydrogen by volume;

the gas mixture contains from 0.1% to 0.5% $CO_2$, preferably from 0.1% to 0.4% $CO_2$ and even more preferably from 0.1% to 0.3% $CO_2$;

the gas mixture consists, by volume, of 0.1 to 0.5% $CO_2$, of 16 to 19% helium and of argon for the rest, preferably around 0.3% $CO_2$, around 18% helium and argon for the rest;

the gas mixture consists, by volume, of 0.1 to 0.3% $CO_2$ and of argon for the rest;

the gas mixture consists, by volume, of 0.1 to 0.3% $CO_2$, of 15 to 50% helium and of argon for the rest;

the gas mixture consists, by volume, of 0.1 to 0.3% $CO_2$, of 1 to 5% hydrogen and of argon for the rest, preferably of 0.1 to 0.3% $CO_2$, of 3 to 5% hydrogen and of argon for the rest;

a solid or flux-cored meltable wire is used, the grade of which is chosen depending on the alloy family or families in question, that is to say depending on the nickel alloy to be welded;

the process is carried out in short-arc, pulsed or axial spray transfer mode depending on the nature of the wire used (solid or flux-cored).

The invention also relates to a gas mixture consisting, by volume, of 0.1 to 0.3% $CO_2$, of 1 to 5% hydrogen and of argon for the rest, preferably of 0.1 to 0.3% $CO_2$, of 3 to 5% hydrogen and of argon for the rest.

In addition, the invention also relates to a gas mixture consisting, by volume, of 0.1 to 0.3% $CO_2$, of 15 to 50% helium and of argon for the rest, to a gas mixture consisting, by volume, of 0.1 to 0.3% $CO_2$ and of argon for the rest and to a gas mixture containing (by volume) from 0.05% to 5% $CO_2$, and the rest being argon, preferably from 0.1% to 4% $CO_2$, the rest being argon, and even more preferably from 0.1% to 1.5% $CO_2$, and the rest being argon.

Furthermore, the invention also relates to the use of one of the above gas mixtures to produce a coating made of nickel or a nickel alloy on at least one metal workpiece made of carbon steel, stainless steel, nickel or a nickel alloy, preferably a workpiece made of nickel or a nickel alloy.

BRIEF DESCRIPTION OF THE DRAWINGS

The invention will now be described in greater detail with reference to the appended drawings wherein:

FIG. 2a' is a graph of voltage as a function of time with a shielding gas consisting of argon and 18–20% helium;

FIG. 2b' is a graph of voltage as a function of time with a shielding gas consisting of argon, 18–20% helium and 0.11% $CO_2$;

DETAILED DESCRIPTION OF THE INVENTION

Illustrative Examples of the Invention

The inventors of the present invention carried out a number of trials and thus demonstrated that certain shielding gases or gas families usually dedicated to the welding of stainless steels can also be suitable for the efficient welding of nickel alloys, although the properties of these two types of material are completely different, provided that the content of oxidizing element, that is to say in this case the $CO_2$ content, is limited.

Thus, a ternary mixture essentially consisting of argon to which 18% helium and 1% $CO_2$ have been added (until reaching 100% by volume) can be completely suitable for welding nickel alloys, particularly if the welded assembly undergoes, after welding, a finishing operation, such as a chemical pickling/passivation operation or a mechanical cleaning operation on the weld, which is slightly oxidized during and after welding.

However, if under the same operating conditions the welded assembly remains in the as-welded state, the nature of the gas shield must be tailored so as to obtain a good compromise between arc stability and limiting the surface oxidation of the weld bead.

From the trials carried out, three main families of gas mixtures that can be used to weld nickel alloys emerged, namely:

binary argon/$CO_2$ gas mixtures having a $CO_2$ content preferably greater than about 0.1% in order to ensure arc stability and less than 1% in order to limit the oxidation of the deposited metal, preferably less than 0.3%;

ternary argon/$CO_2$/helium gas mixtures, with a $CO_2$ content identical to the above mixtures and the helium content of which is between 15 and 50% (the rest being argon), thereby making it possible to improve the wetting of the weld bead; and argon/$CO_2$/hydrogen ($H_2$) mixtures with a $CO_2$ content identical to those of the above mixtures and the hydrogen content of which is between about 1% and about 5% (the rest being argon) so as to further improve the wetting and making it possible, owing to the reducing nature of hydrogen, to limit the surface oxidation of the weld bead.

Figure 1B:
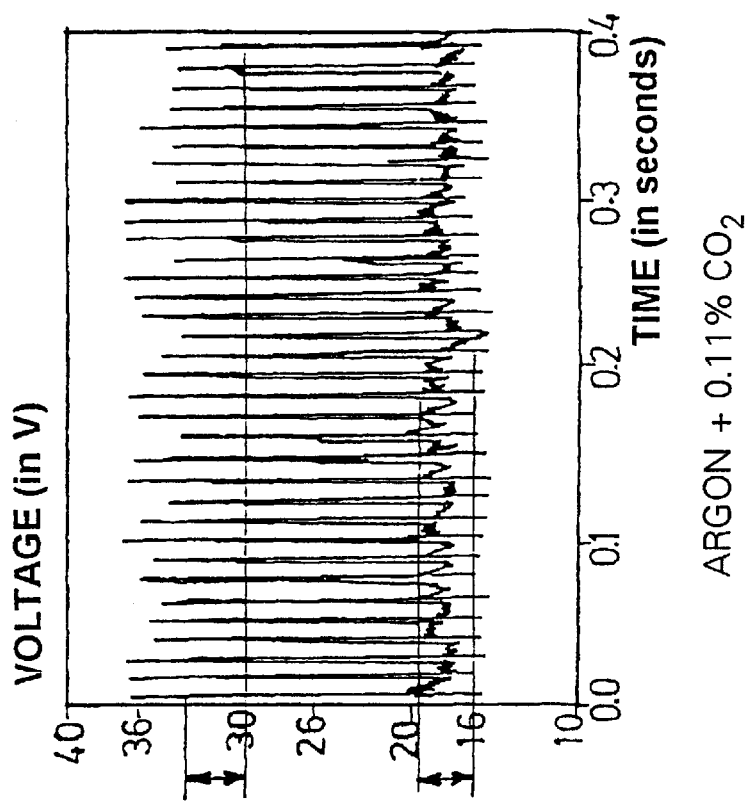
FIG. 1b is a graph of voltage as a function of time with a shielding gas consisting of argon and 0.11% $CO_2$.
Figure 1A:
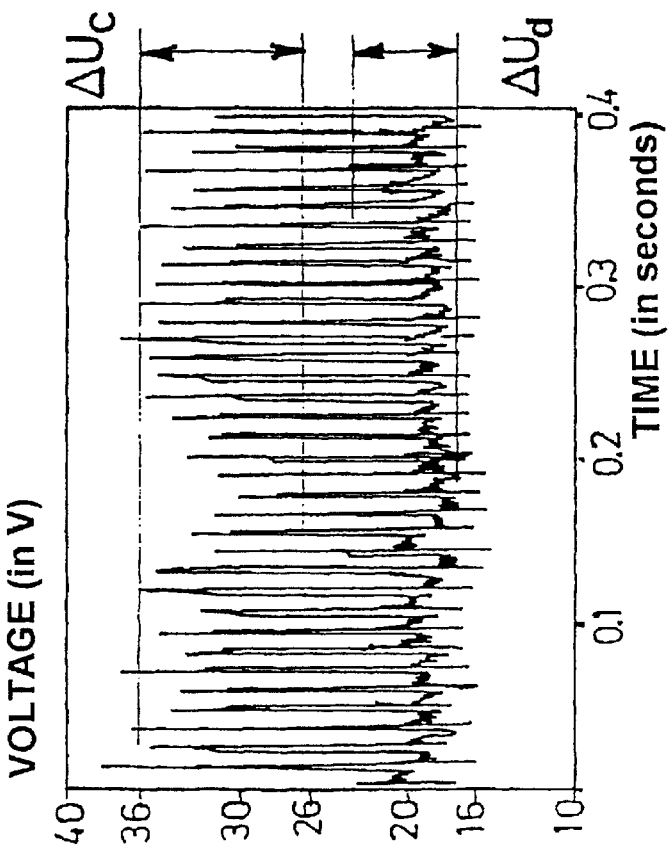
FIG. 1a is a graph of voltage as a function of time with a shielding gas consisting of pure argon.

FIGS. 1a and 1b show graphs of voltage (in volts) as a function of time (in seconds) obtained in MIG welding with a shielding gas consisting of pure argon (FIG. 1a) and, as a comparison, with argon to which 0.11% of $CO_2$ has been added according to the invention (FIG. 1b).

These graphs were obtained by performing a pulsed-current MIG welding operation with full-sheet deposition on a material made of a 625-grade nickel alloy and with a filler material (wire) of the same grade, for a welding speed of 21 cm/min and a wire speed of 4.5 m/min.

It may be clearly seen (FIG. 1b) that the addition of 0.11% $CO_2$ in pulsed mode is sufficient to stabilize the electric arc since there is a reduction in the peak voltage variations ($\Delta U_c$) and in the voltage variations ($\Delta U_d$) at the moment of detachment of the droplet of molten metal.

In an analogous manner, there was also found to be a similar effect when 0.11% $CO_2$ was added to an argon base containing approximately 5% hydrogen (FIG. 2b) compared with a control gas mixture consisting only of argon and hydrogen in the same proportions (FIG. 2a), this being explained by a beneficial cumulative effect of the $CO_2$ with that of the hydrogen on arc constriction, that is to say an increase in the energy density, and on the reduction in surface oxidation of the weld beads.

Figures 2A, 2B:
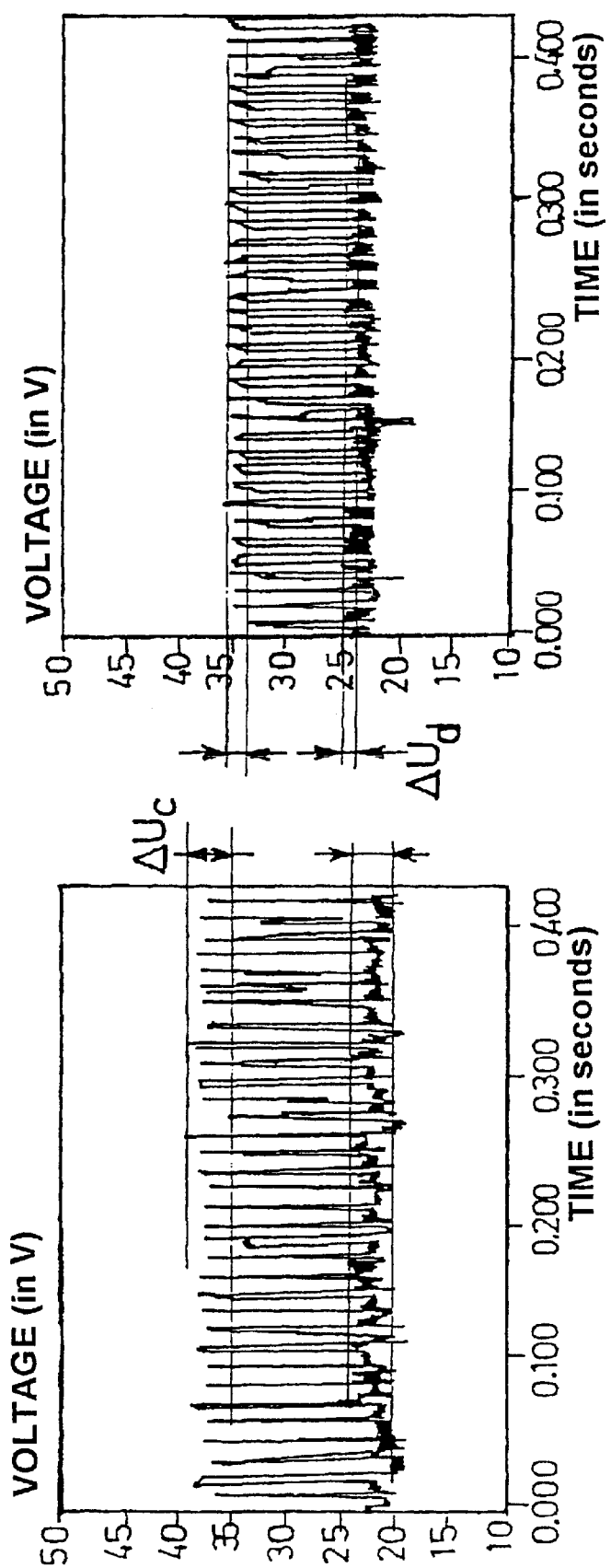
FIG. 2a is a graph of voltage as a function of time with a shielding gas consisting of argon and 5% hydrogen.
FIG. 2b is a graph of voltage as a function of time with a shielding gas consisting of argon, 4–5% hydrogen and 0.11% $CO_2$.
Figure 3:
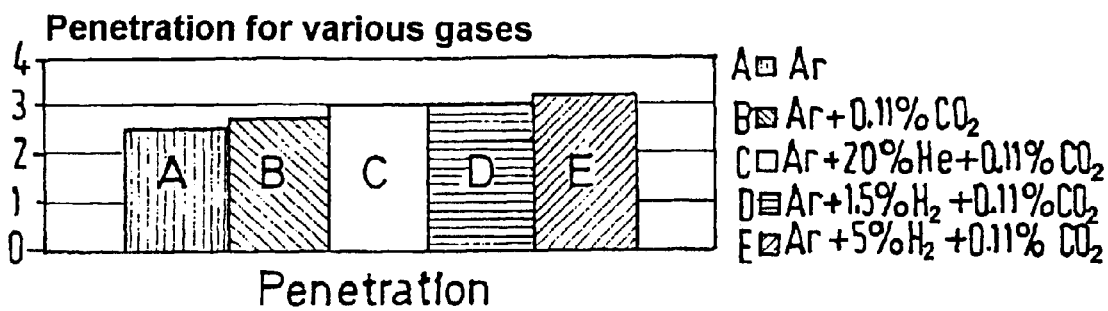
FIG. 3 shows the weld penetration using various gas mixtures.
Figure 4:
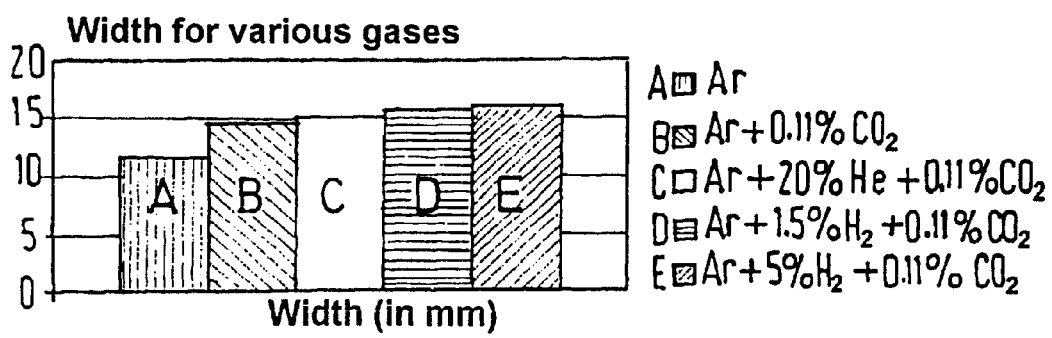
FIG. 4 shows the weld bead width using various gas mixtures.
Figure 5:
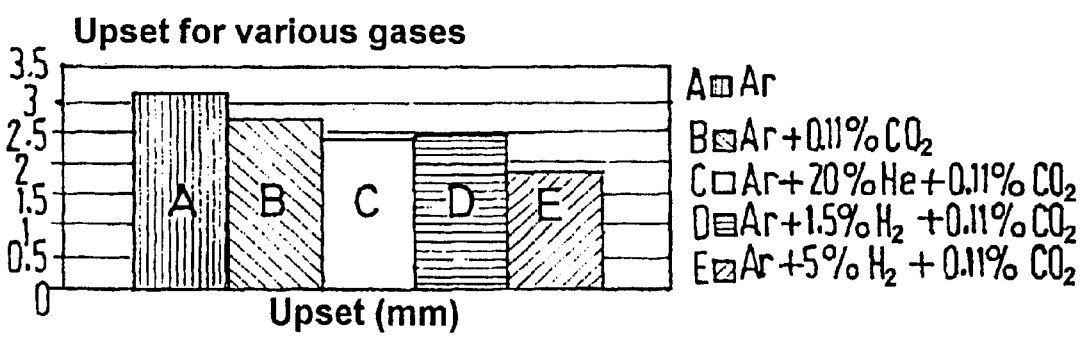
FIG. 5 shows the resulting upset obtained using various gas mixtures.
Figure 6:
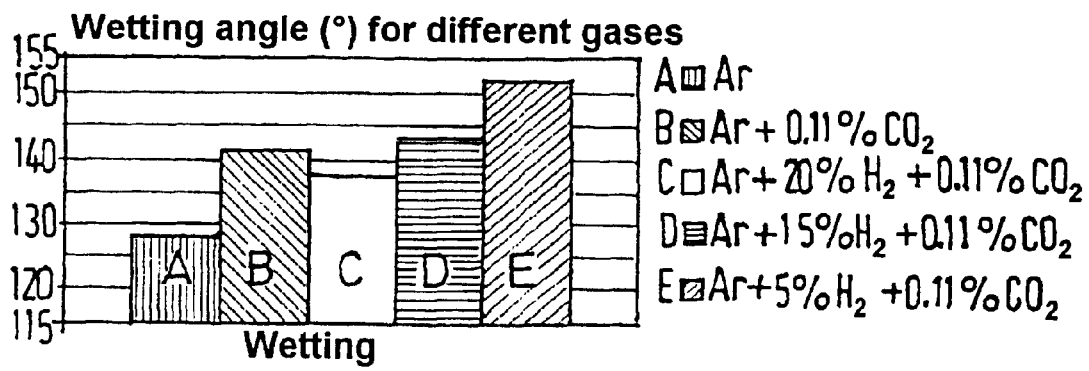
FIG. 6 shows the wetting angle obtained using various gas mixtures.

Likewise, similar results were obtained by adding 0.11% $CO_2$ to an argon base containing approximately 18 to 20% helium (FIG. 2b') compared with a control gas mixture consisting only of argon and helium in the same proportions (FIG. 2a').

Moreover, the welding results obtained in the various trials carried out on 3 mm thick plates of INCO 625 nickel alloy are given in Table I below, which shows the increases in welding speed and improvement in arc stability, during metal transfer, which are observed for various gas mixtures according to the invention and, by comparison, for pure argon (prior art), when these various gas mixtures are used as shielding gases in the MIG process.

TABLE

Comparative MIG welding trials

|  | PRIOR ART | | INVENTION | |
|---|---|---|---|---|
| Argon | 100 vol % | The rest up to 100 vol % | | |
| Helium | — | — | 18 to 20% | — |
| $H_2$ | — | — | — | 4 to 5% |
| $CO_2$ | — | 0.11% | 0.11 to 1% | 0.11% |
| Arc stability | Poor (FIG. 1a) | Good (FIG. 1b) | Good (FIG. 2b') | Good (FIG. 2b) |
| Welding speed | Control | +12% | +17% | +26% |
| Nickel alloy type | | Evaluation on INCO 625 | | |

Moreover, FIGS. 3 to 6 show the dimensions of weld beads produced by full-sheet MIG welding, under the same operating conditions as previously, using various gas mixtures, namely pure argon or mixtures according to the invention, that is to say those comprising argon to which 0.11% $CO_2$ was added and possibly including, in addition, 20% helium, about 1.5% hydrogen or about 5% hydrogen.

Figure 7:
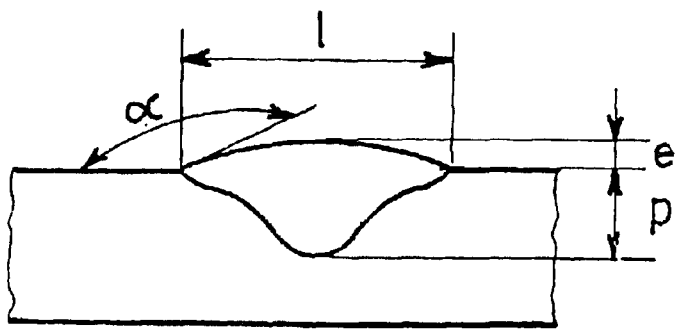
FIG. 7 shows the various measurement parameters and their positions of the weld beads.

These FIGS. 3 to 6 illustrate the weld penetration (P) obtained (FIG. 3), the weld bead width (1) obtained (FIG. 4), the resulting upset (e) obtained (FIG. 5) and the wetting angle ($\alpha$) obtained (FIG. 6), each with tested gases or gas mixtures; these various measurement parameters and their positions are shown schematically in FIG. 7.

These results clearly show the benefit, over pure argon, of adding $CO_2$ gas on the one hand and helium or hydrogen gas on the other hand, as-such additions result in:

an increase in the penetration P;

an improvement in the wetting, resulting in better spreading, that is to say a greater weld bead width (1) and a reduction in the upset (e), together with an increase in the wetting angle ($\alpha$); and a very substantial reduction in weld bead surface oxidation with a supplementary addition of about 4 to 5% hydrogen.

This evaluation of weld bead morphology was also supplemented by a characterization of the corresponding welded joints, namely compactness and mechanical properties, especially in order to be able to pronounce on the possibility of damage of the welded joints by excessive solubility of hydrogen in the molten metal, which can result not only in an unacceptable level of porosity but also in inadequate low-temperature toughness values.

The comparative results obtained by the MIG process according to the invention and by TIG or plasma processes on weldments made of nickel alloy of the INCO 600 and INCO 625 types, given in Table II below, indicate that:

the joint coefficients and intrinsic toughness values at −196° C. are very comparable with those obtained in TIG (Tungsten Inert Gas) and plasma welding processes using shielding gases of the Ar/$H_2$ type;

the total hydrogen content in multipass welding is about 8 ppm, which, for the materials tested, lies between the 2 aforementioned processes, namely between 6 ppm in plasma welding and 14 ppm in TIG welding.

TABLE II

Performance comparison in MIG, TIG and plasma welding

| | INCO 625 | | | INCO 600 | | |
|---|---|---|---|---|---|---|
| Alloy Process | TIG | PLASMA | MIG | TIG | PLASMA | MIG |
| $R_m$ of welded metal (in MPa) | 813 | 820 | 823 | 682 | 655 | 671 |
| $R_m$ of base metal (in MPa) | | 924 | | | 717 | |
| Joint effectiveness ($R_m$ of welded metal/$R_m$ of base metal) | 0.88 | 0.89 | 0.89 | 0.95 | 0.91 | 0.93 |
| Toughness $K_{CV}$ (J) | | | | | | |
| +20° C. | 42 | 49 | 56 | 88 | 84.5 | 80.6 |
| lateral expansion (in mm) | 1.4 | 1.4 | 1.2 | | 1.9 | |
| −196° C. | 38.7 | 38 | 49 | 88 | 99.3 | 83 |
| lateral expansion (in mm) | 1.2 | 1.2 | 1.3 | | 1.8 | |
| Total hydrogen content in welded metal (weldment) | | | 4 ppm | | | 4.6 ppm |
| Total hydrogen content in welded metal (multilayers) | 14 ppm | 6 ppm | 7.3 ppm | 12 ppm | 6 ppm | 8 ppm |

The hydrogen contamination of the molten metal is therefore no more critical than in TIG or plasma welding and involves no significant degradation of the intrinsic characteristics of the weldments.

Figure 8:
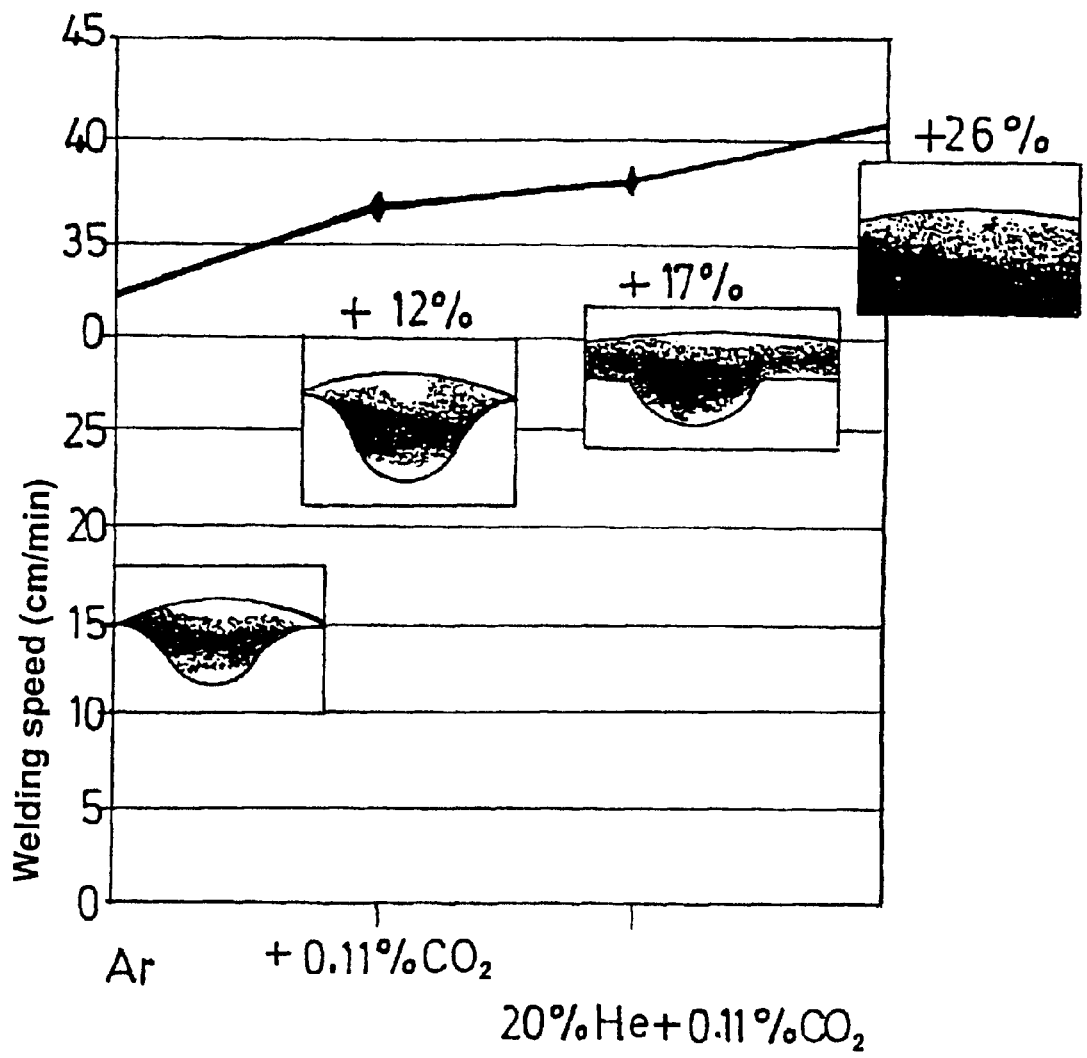
FIG. 8 shows welding speed using various shielding gases.

In addition, such additions of gas may improve the productivity by increasing the welding speed. This is because, compared with pure argon, for the same penetration or the same weld bead width, it is possible to increase the welding speed considerably, as shown in FIG. 8 in which a gas mixture consisting of Ar+$H_2$+$CO_2$ results in an increase in welding speed of possibly up to about +26%.

Furthermore, examination of the surface appearance of the weld beads confirmed the benefit of limiting the $CO_2$ content in order to minimize surface oxidation, both in automatic welding and in manual welding.

In practice, making the additions according to the invention is therefore favourable for welding operations (bonding between two or more components) or overlaying operations. In both cases, the finishing operations after welding are limited and the corrosion resistance behavior of the weldments is improved without degrading their mechanical properties.

Nickel or nickel alloy structures welded by the MIG process according to the invention are, for example:

pipes, pumps, exchangers and boilers for synthetic fibres and soda chemistry (pure Ni family);

columns, reactors, heat exchangers, storage tanks for hydrofluoric acid chemistry, seawater desalination plants, offshore equipment (NiCu family), nuclear reactors, on shore or on-board equipment (NiCr family);

furnaces and manifolds for catalytic cracking and reforming in the petrochemical industry (NiCrFe family);

turbojets in the aeronautical industry and gas turbines (NiCrFeNb grade); and fixed or transportable liquefied-gas storage tanks made of steels containing 5.5 or 9% Ni, the welding of which requires a filler metal made of NiCr or NiCrMo grades.

What is claimed is:

1. In a process for MIG welding of nickel and nickel alloys, which comprises passing a current through a meltable electrode to melt the electrode and form a welding zone, the improvement comprising the step of shielding at least part of the welding zone with a gas mixture consisting of, by volume:

from 0.05% to 0.5% $CO_2$ and balance being argon.

2. The process according to claim 1, wherein the gas mixture consists of from 0.1% to 0.3% $CO_2$ and balance being argon.

3. The process according to claim 1, wherein the electrode comprises a solid or flux-cored meltable wire.

4. The process according to claim 1, wherein the process is carried out in short-arc, pulsed or axial spray transfer mode.

5. In a process for MIG welding of nickel and nickel alloys, which comprises passing a current through a meltable electrode to melt the electrode and form a welding zone, the improvement comprising the step of shielding at least part of the welding zone with a gas mixture consisting of, by volume:

from 0.05% to 0.3% $CO_2$, from 18% to 25% helium and balance being argon.

6. The process according to claim 5, wherein the gas mixture consists of from 0.1% to 0.3% $CO_2$.

7. The process according to claim 5, wherein the electrode comprises a solid or flux-cored meltable wire.

8. The process according to claim 5, wherein the process is carried out in short-arc, pulsed or axial spray transfer mode.

9. The process according to claim 5, wherein the gas mixture consists of from 18% to 20% helium.

10. In a process for MIG welding of nickel and nickel alloys, which comprises passing a current through a meltable electrode to melt the electrode and form a welding zone, the improvement comprising the step of shielding at least part of the welding zone with a gas mixture consisting of, by volume:

from 0.05% to 0.5% $CO_2$, from 0.1% to 10% hydrogen and balance being argon.

11. The process according to claim 10, wherein the gas mixture consists of:

from 0.05% to 0.5% $CO_2$, from 1% to 7% hydrogen and balance being argon.

12. The process according to claim 10, wherein the gas mixture consists of from 0.1% to 0.3% $CO_2$, from 1% to 5% hydrogen and balance being argon.

13. The process according to claim 10, wherein the gas mixture consists of, by volume, 0.1% to 0.3% $CO_2$, 3% to 5% hydrogen and balance being argon.

14. The process according to claim 10, wherein the electrode comprises a solid or flux-cored meltable wire.

15. The process according to claim 10, wherein the process is carried out in short-arc, pulsed or axial spray transfer mode.

16. In a process for coating at least one metal workpiece selected from the group consisting of carbon steel, stainless steel, nickel and nickel alloys with nickel or a nickel alloy, which comprises melting a wire of nickel or a nickel alloy and forming a melting zone, the improvement comprising the step of shielding at least part of the melting zone with a gas mixture consisting of, by volume:

from 0.05% to 0.5% $CO_2$ and balance argon.

17. In a process for coating at least one metal workpiece selected from the group consisting of carbon steel, stainless steel, nickel and nickel alloys with nickel or a nickel alloy, which comprises melting a wire of nickel or a nickel alloy and forming a melting zone, the improvement comprising the step of shielding at least part of the melting zone with a gas mixture consisting of, by volume:

from 0.05% to 0.5% $CO_2$, from 0.1% to 10% hydrogen and balance argon.

18. In a process for coating at least one metal workpiece selected from the group consisting of carbon steel, stainless steel, nickel and nickel alloys with nickel or a nickel alloy, which comprises melting a wire of nickel or a nickel alloy and forming a melting zone, the improvement comprising the step of shielding at least part of the melting zone with a gas mixture consisting of, by volume:

from 0.05% to 0.3% $CO_2$, from 18% to 25% helium and balance argon.

* * * * *